United States Patent

[11] 3,628,615

| [72] | Inventor | Martin E. Chenevert<br>Houston, Tex. |
|---|---|---|
| [21] | Appl. No. | 5,826 |
| [22] | Filed | Jan. 26, 1970 |
| [45] | Patented | Dec. 21, 1971 |
| [73] | Assignee | Esso Production Research Company<br>Continuation of application Ser. No.<br>702,635, Feb. 2, 1968, now abandoned.<br>This application Jan. 26, 1970, Ser. No.<br>5,826 |

[54] WATER-BASE WELL FLUIDS FOR SHALE STABILITY AND USE THEREOF
41 Claims, 5 Drawing Figs.

[52] U.S. Cl. ................................................ 175/65,
73/64.2, 166/275, 166/305 R, 252/8.5 P, 252/8.55 D
[51] Int. Cl. ....................................................E21b 21/04,
E21b 43/25, G01n 7/10
[50] Field of Search .......................................... 175/65.57;
252/8.5 M, 8.5 P, 8.55 D, 8.55 A; 166/250, 252,
305 R, 308, 274, 275, 273, 64; 73/64.2, 64.3, 153,
155, 61.1

[56] References Cited
UNITED STATES PATENTS

| 2,799,646 | 7/1957 | Lacey et al. ................... | 252/8.5 P |
| 2,876,197 | 3/1959 | Watkins ....................... | 252/8.5 P |
| 3,318,138 | 5/1967 | Rolfson ....................... | 73/64.3 |
| 3,422,890 | 1/1969 | Darley.......................... | 166/305 R |
| 3,506,070 | 4/1970 | Jones............................ | 166/274 X |

*Primary Examiner*—Stephen J. Novosad
*Attorneys*—James A. Reilly, John B. Davidson, Lewis H. Eatherton, James E. Gilchrist, Robert L. Graham and James E. Reed ABSTRACT: A method for drilling a borehole through a water-sensitive earth formation with a drilling fluid having a water continuous phase wherein a semipermeable membrane is interposed between the drilling fluid and water-sensitive formation and the aqueous vapor pressure of the drilling fluid is maintained at a level substantially equal to or below that of the water-sensitive formation. Also, improved water-base well fluid compositions which have a continuous aqueous phase, a dispersed phase comprising droplets of oil, a surfactant capable of causing the oil containing the surfactant to coat a water-sensitive earth formation with a semipermeable membrane, and an aqueous vapor pressure depressant in the continuous aqueous phase.

INVENTOR.
MARTIN E. CHENEVERT

BY *James E. Gilhuit*

ATTORNEY

INVENTOR.
MARTIN E. CHENEVERT

BY
*James E. Gilhuit*

ATTORNEY

WATER-BASE WELL FLUIDS FOR SHALE STABILITY AND USE THEREOF

CROSS-REFERENCE TO RELATED APPLICATIONS

This application is a continuation-in-part of application number 702,635 filed Feb. 2, 1968, now abandoned.

BACKGROUND OF THE INVENTION

1. Field of the Invention

This invention is directed to the drilling of boreholes in the earth and is particularly concerned with a method and fluid compositions for drilling with water-base drilling fluids that will provide borehole stability in clays, shales and other water-sensitive formations.

2. Description of the Prior Art

The problems encountered in drilling through shales and similar water-sensitive formations are of long standing in the petroleum industry. Such problems are particularly acute in deep formations containing hard shales, but they are also troublesome in shallower formations. The nature and extent of the difficulties encountered generally depend in part upon the characteristics of the particular water-sensitive formations to be penetrated. Geologically speaking, such formations normally contain clays or other fine-grained argillaceous materials which in a compressed state have very low permeabilities, generally less than 0.001 millidarcy. Since such materials may have been deposited under widely differing conditions and subsequently subjected to different degrees of pressure and temperature, water-sensitive formations are found with mineral compositions and water contents which vary considerably.

Within the petroleum industry, water-sensitive shale formations are broadly categorized as either "soft" shales or "hard" shales. Soft shales are generally considered to include the plastic, gumbo, wet, hydratable, and swelling shales which "dissolve" or disperse readily within water or aqueous fluids. "Hard" shales, on the other hand, are hard and are substantially insoluble and not dispersible within aqueous media. Hard shales also generally contain much less water and montmorillonite than do soft shales. Unlike hard shales, soft shales rarely if ever occur in formations older than Mesozoic. Examples of well-known hard shales are formations such as the Midway and Dexter shales in East Texas and West Louisiana, the Wolfcamp shale in West Texas and the Springer and Atoka shales in Oklahoma.

Soft shales and hard shales both present serious problems during drilling operations. If soft shales are drilled with water or water-base fluids, for example, they may readily disperse or "dissolve" in the circulating fluid to form a troublesome plastic mass. Hard shales, on the other hand, do not normally disperse in the fluid, but nevertheless quickly lose their strength and break and slough. The dispersion of soft shales into water-base muds has been generally attributed to the presence of montmorillonite in these shales, but until recently there has been no satisfactory or accepted explanation for the failure of hard shales. The extremely low permeabilities of these shales have led many observers to theorize that drilling fluids can penetrate only along the bedding planes and that the failures which occur are due to such penetration. It has also been generally assumed that hard shales are nonswelling in the presence of water.

In drilling through gumbo and other soft shales, difficulties due to shale swelling have been alleviated to some extent by the use of water-in-oil invert emulsion muds and other oil-base fluids. The use of invert emulsion muds prepared with saturated sodium chloride solutions or containing moderate amounts of calcium chloride, normally less than 250,000 parts per million, in the water phase of the emulsions has also provided some improvement. The results obtained with such fluids, however, have generally been inconsistent and unpredictable.

Oil-base muds, including water-in-oil invert emulsion muds, have also been used for drilling hard shales. In most instances their use in drilling formations of this latter type has provided little, if any, improvement over the use of water-base muds. Although increasing the weight of the drilling fluid and drilling more slowly often helps, efforts to overcome difficulties encountered with hard shales have in the past been largely unsuccessful. There therefore exists a need for drilling techniques and fluid compositions which will overcome the shale problems outlined above.

SUMMARY OF THE INVENTION

It has recently been found that many of the difficulties encountered in drilling through shales and similar water-sensitive formations can be avoided by utilizing oil-base drilling fluids that are compatible with such formations. Studies associated with the present invention indicate that all argillaceous shales, even hard shales, have a strong affinity for water and that they demonstrate their sensitivity to water by undergoing changes in their dimensions of internal stresses upon absorption or desorption of water. These changes, although sometimes very slight, contribute materially to formation failure. Studies associated with the present invention also show that such absorption occurs even when argillaceous shales are contacted by water-in-oil emulsions and other oil-base muds containing water. This absorption can be effectively inhibited by drilling a water-sensitive formation with a water-in-oil emulsion or other oil-base drilling mud containing a water vapor pressure depressant in the aqueous phase in a concentration sufficient to reduce the aqueous vapor pressure of the mud to a level substantially equal to or below that of the formation. However, application of the above method requires than an oil-base or water-in-oil emulsion drilling fluid be used. These oil-base drilling fluids are expensive and are not suitable for use with certain types of logging equipment commonly used to survey boreholes.

The method and fluid composition of this invention enable the user to take advantage of the economy and flexibility of drilling fluids having a water continuous phase while enjoying the shale stabilization properties previously restricted to modified oil-base drilling fluids. This improved method of drilling a borehole through a clayey, water-sensitive earth formation with a water-base drilling fluid includes interposing between the drilling fluid and the water-sensitive formation a semipermeable membrane and maintaining the aqueous vapor pressure of the water-base drilling fluid at a level substantially equal to or below the aqueous vapor pressure of the water-sensitive formation. The semipermeable membrane can be interposed between the drilling fluid and the water-sensitive formation by periodically circulating a slug of oil, surfactant, or a mixture of the two down the drill string so as to coat the formation. An alternative method for forming the semipermeable membrane is to drill with a specially composed water-base mud containing a small volume of oil and a surfactant suitable for causing the oil containing the surfactant to coat the water-sensitive formation.

Since the aqueous vapor pressure of the drilling fluid relative to the water-sensitive formation must normally be controlled to establish and maintain stabilization of the water-sensitive formation, periodic relative vapor pressure determinations are desirable. A helpful method for determining the aqueous vapor pressure of one material relative to another material, where at least one of the materials contains water, is to interpose between the materials a semipermeable membrane which contacts both of the materials, and to detect the direction of water migration between the materials through the membrane. The membrane preferably comprises surfactant or an oil containing a surfactant.

By facilitating the stabilization of water-sensitive formations while using a water-base drilling fluid, the method and materials of the invention provide a drilling system which is less expensive than oil-base drilling fluids and is more adaptable for use with various types of logging equipment, while retaining the desirable shale stabilizing characteristics of the modified oil-base muds. The method and drilling fluid composition of the invention therefore have significant advantages over drilling fluid systems existing heretofore.

DESCRIPTION OF THE PREFERRED EMBODIMENTS

It has been experimentally determined and confirmed in actual drilling wells that where a water-in-oil emulsion or other oil-base drilling fluid, having an aqueous phase and an aqueous vapor pressure substantially equal to or less than that of a shale or other argillaceous, water-sensitive formation, is used to drill through the formation, the drilling fluid will improve borehole stability. It has also been found that direction and extent of water migration between the aqueous phase of the oil-base drilling fluid and the water-sensitive formation are functions of the relative aqueous vapor pressures of the drilling fluid and the formation. Although the process which causes migration is not fully understood, it appears that a semipermeable membrane is imposed between the drilling fluid and the water-sensitive formation causing water to migrate from the material having the higher aqueous vapor pressure to the material having the lower aqueous vapor pressure. In oil-base mud systems this semipermeable membrane evidently is formed by oil containing a surfactant which is usually a water-in-oil emulsifier.

The method of achieving stabilization of shales and other clayey, water-sensitive formations while using the water-base drilling fluid of this invention appears to be based on the same concept. A semipermeable membrane is interposed between the drilling fluid and the water-sensitive formation and at the same time the aqueous vapor pressure of the water-base drilling fluid is maintained at a level substantially equal to or below the aqueous vapor pressure of the water-sensitive formation. The term semipermeable membrane as used herein refers to a membrane which permits water to flow therethrough while restricting the passage of ions. Two satisfactory methods of interposing such a semipermeable membrane are as follows: (1) periodically treating the wellbore with slugs of a material such as a surfactant, oil, oil containing a surfactant, or a water-in-oil emulsion so as to coat the formation with a thin semipermeable membrane; and (2) drilling with a specially composed water-base drilling fluid which contains small quantities of oil containing a surfactant capable of causing the oil to coat the water-sensitive formation.

The slug process consists of periodically pumping a slug of a material such as a surfactant, oil, oil containing a surfactant, or a water-in-oil emulsion into the the borehole so that it adheres to the walls and thereby establishes and maintains a semipermeable membrane on the water-sensitive formation. Although the slug frequency required to initially form and maintain this semipermeable membrane will vary from system to system as a function of penetration rate, temperature, circulation rate, and other variables, a frequency of once or twice a day is contemplated from a practical standpoint. Then, if the salinity of the water-base mud is controlled so that its aqueous vapor pressure never substantially exceeds the aqueous vapor pressure of the water-sensitive formation, formation stability will be maintained.

Figure 1:
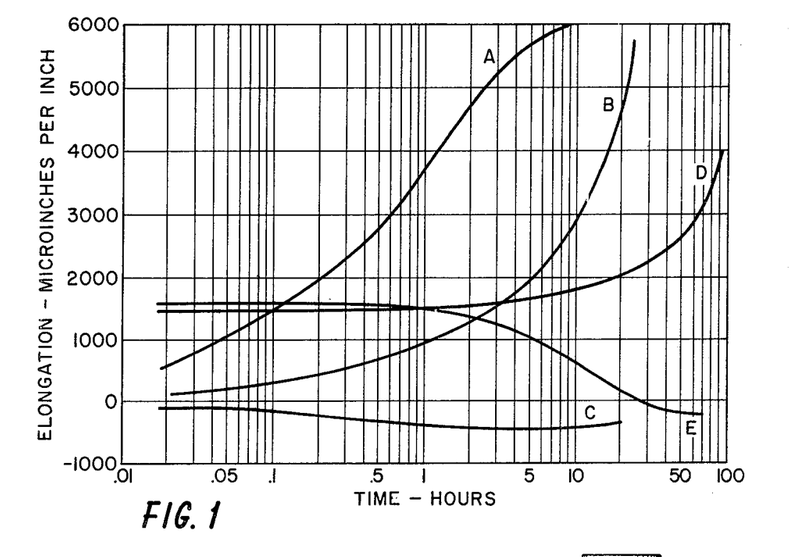
FIG. 1 graphically depicts unit elongation versus log-time data recorded while observing water absorption by samples of a hard argillaceous shale exposed to various drilling fluids.

Referring to FIG. 1 of the drawing, Curve A illustrates unit strain versus log-time data for a shale sample that has been exposed to pure water. These data were obtained with a displacement transducer similar to the one subsequently described herein. Curve B depicts similar data for a sample immersed in a saturated aqueous CaCl solution. Curve C illustrates a shale sample that has been immersed in a water-in-oil emulsion drilling fluid having an aqueous vapor pressure less than that of the shale sample. Curve D represents a shale sample which has initially been exposed to a vapor pressure depressant-treated water-in-oil emulsion drilling fluid which has a vapor pressure somewhat in excess of the sample subsequently had the emulsion withdrawn and replaced with pure water. Curve E represents behavior of a sample treated in the same fashion as that of curve D except that the water which was added to replace the water-in-oil emulsion was saturated with $CaCl_2$. Curves A and B clearly show that both pure water and water saturated with $CaCl_2$ will cause rapid deformation of the shale sample. The vapor pressure depressant-treated water-in-oil emulsion drilling fluids, Curve C, illustrates a stable drilling fluid/shale combination. Curves D and E demonstrate that the semipermeable membrane, once formed, will remain on the shale for a period of time. In curve D, which represents water-in-oil emulsion replaced by pure water after 20 hours, the strain-time behavior is not as unfavorable as that of the pure water system but is quite severe when compared with the performance of the treated water-in-oil emulsion drilling fluid of curve C. This indicates that there is a semipermeable membrane in existence which to some extent retards water absorption by the shale formation; however, because the vapor pressure of the drilling fluid exceeds that of the shale formation, migration of water from the drilling fluid through the membrane and into the shale formation is occurring. Curve E shows that replacing the emulsion fluid with an aqueous solution that is saturated with $CaCl_2$ results in behavior characteristic of a water-in-oil emulsion that has been saturated with a vapor pressure depressant. This indicates that the semipermeable membrane initially formed remains after the water-in-oil emulsion has been removed and that because the aqueous vapor pressure of the formation exceeds the aqueous vapor pressure of the drilling fluid which has had a vapor pressure depressant added to it, migration is occuring from the formation to the drilling fluid. Thus, it is seen that a residual film remains after the formation is treated with a slug of water-in-oil emulsion drilling fluid and that when a vapor pressure depressant is added to the water-base fluid that is circulated, the system responds in the same fashion as a treated water-in-oil emulsion.

Application of a surfactant capable of coating the formation with a semipermeable membrane also yields favorable results. The pure surfactant membrane appears to be extremely durable. Similarly, use of an oil containing a surfactant capable of causing the oil to coat the water-sensitive formation results in stabilization of the formation. The concentration of the surfactant may range from below 5 v/o of the oil-surfactant system up to 100 v/o surfactant. The behavior of pure diesel oil approaches that of the water-in-oil invert emulsion for a short time after the oil is replaced by an aqueous $CaCl_2$ solution, however, the membrane appears to deteriorate with time. It is therefore preferable to add a surfactant to coating oils, as is the case with the water-in-oil emulsion of curve E, to insure stability of the membrane.

A wide range of surfactants are satisfactory for coating the formation with a semipermeable membrane. In general, those commercial surfactants which form stable water-in-oil emulsions are particularly suitable. The membrane performance of surfactants varies widely with the type of surfactant used, but one particularly successful surfactant is Sorbitan Monooleate. Other surfactants particularly suited for use with the method of the invention include polyalkyl mono- and di-carboxylic acids. Also contemplated to be useful are the polyalkyl tri-carboxylic acids. Specific surfactants that are especially suited for use with method of the invention include monocarboxylic acid derivatives of polyisobutylene having a molecular weight of the order of 800–1000; these can be prepared by the condensation of chlorinated polyisobutylene with acrylic acid and may be referred to herein for simplicity as polyisobutylene acid. Also especially suitable are the dicarboxylic acid derivatives of polyisobutylene having a molecular weight of the order of 800-1000; these can be prepared in anhydride form by condensation of chlorinated polyisobutylene with maleic anhydride and may be referred to herein for simplicity as polyisobutylene succinic acid. Another very suitable class of surfactants can be prepared in anhydride form by the condensation of chlorinated propylene tetramer with maleic anhydride. These can be referred to simply as dodecyl succinic acid.

An alternative method of establishing the semipermeable membrane is to use a special aqueous drilling fluid prepared by adding to a water-base mud limited quantities of oil containing a surfactant suitable for causing oil containing the surfactant to coat the walls of the borehole. The preferred surfactant is a water-in-oil emulsifier. Since a water-continuous system is desired, the concentration of water, which is normally the discontinuous, dispersed phase when a water-in-oil emulsifier is used, must be maintained above the inversion point. Although the concentration of water required to exceed the inversion point will vary with temperature, emulsifier composition, emulsifier concentration, and other variables so that the inversion point for a given system should normally be determined experimentally, it has been found that maintaining the water volume above ninety percent of the water-base system is generally satisfactory.

The preferred method for preparing such a water-base mud is to first mix a water-base mud having the properties that are desired for drilling the well. These properties should include the addition of sufficient quantities of a vapor pressure depressant to maintain the aqueous vapor pressure of the water-base drilling fluid at a level which is substantially equal to or below that of the water-sensitive formation. The oil containing the surfactant should then be added in limited quantities so as to assure that the system remains above the inversion point and remains water-continuous. Agitation of the system will complete the dispersion of the oil phase. By increasing the concentration of the oil phase within the water-continuous system instead of increasing the concentration of the water phase within a initially oil-continuous system, the necessity of the system passing through the inversion point to reach the desired composition is eliminated. This is desirable because the system becomes highly viscous at the inversion point and may have a jellylike consistency that makes it very unwieldy to handle.

Although the mechanism of formation of the semipermeable membrane is not fully understood, its existence is evident from experimental determinations. The oleaginous dispersion formed by the preferred combination of materials may be a multiple emulsion in which bubbles of water surrounded by a film of oil are suspended within a water-continuous system. Apparently the droplets thus formed are attracted to the argillaceous formation, thereby establishing a membrane of oil containing the surfactant on the borehole wall. In any event, when a surfactant capable of causing the surfactant oil mixture to coat the water-sensitive formation is used the membrane will stabilize the formation if the aqueous vapor pressure of the drilling fluid is maintained at level substantially equal to or less than that of the water-sensitive formation. This shale stabilization will continue for as long as the specially prepared drilling fluid remains stable. A wide range of surfactants are satisfactory for causing oil containing the surfactant to coat the walls of the wellbore and thus useful in creating such a drilling fluid. It has been found, for example, that many commercially available emulsifiers which produce stable water-in-oil emulsions will perform this action when properly combined with water and oil. Although the overall stability and the effectiveness of the resultant fluids vary considerably, one particularly successful composition includes 87 percent water saturated with $CaCl_2$, 97 percent No. 2 diesel oil, and 4 percent Sorbitan Monooleate.

It generally will be most beneficial to maintain the aqueous vapor pressure of the drilling fluid at a level equal to or less than that of the water-sensitive formation when using the slug process or the drilling fluid of the invention. This frequently requires the aqueous vapor pressure of the drilling fluid to be less than that of a saturated sodium chloride solution and often it is desirable to saturate the aqueous phase of the drilling fluid with calcium chloride. In some cases it may even be desirable to reduce the aqueous vapor pressure below that of a saturated calcium chloride solution, as for example, by using an aqueous phase sufficiently concentrated or saturated within lithium chloride. A unique relationship between the drilling fluid and a water-sensitive formation such as an argillaceous shale occurs in the practice of this invention when the aqueous vapor pressure of the drilling fluid is about equal to the aqueous vapor pressure of the water-sensitive formation. This prevents any substantial migration of water in either direction across the semipermeable membrane. Under such conditions the salinity of the continuous phase (if a salt such as sodium chloride, calcium chloride, etc., is being used as the vapor pressure depressant) will remain practically constant throughout the course of the drilling operation, minimizing maintenance otherwise required to maintain the aqueous vapor pressure of the drilling fluid at the desired level. Another advantage of balancing the vapor pressures rather than reducing the vapor pressure of the drilling fluid to a level below that of the formation is the elimination of excessive salinity levels that may otherwise increase the density of the drilling fluid to an undesirable value.

Economics or other considerations may occasionally dictate circumstances when it will not be desirable to attempt to completely reduce the aqueous vapor pressure of the drilling fluid to that of the formation. Under these circumstances water will flow from the aqueous phase of the drilling fluid through the membrane and into the formation. However, so long as the exposure time of the mud to the formation is low, the amount of water flow may not be sufficient to cause excessive formation failure to occur. However, it is preferable to reduce drilling fluid vapor pressure to a level that is equal to or below that of the formation. It is further generally preferable to operate such that no water flow occurs in either direction, i.e., when the aqueous vapor pressures of the drilling fluid and the formation are approximately equal.

An analytical technique for determining the aqueous vapor pressure of one material relative to that of another has been developed which is very helpful when working with a semipermeable membrane separating a water-sensitive formation from a particular drilling fluid in which vapor pressure control is undertaken. The method comprises interposing between two materials, at least one of which contains water, a semipermeable membrane and detecting the direction of water migration between the materials through the membrane. The membrane preferably is composed of oil containing a surfactant or of a pure surfactant. The surfactant is preferably a water-in-oil emulsifier. Although the addition of the surfactant is preferred because of the additional stability it appears to add to the oil membrane, a semipermeable membrane can be formed from an oil containing no surfactant.

Implementation of the above membrane test can take many forms. ONe useful application is in the comparison of the aqueous vapor pressure of a drilling fluid with that of a water-sensitive formation. A sample of the formation having substantially its in situ composition or a synthetic sample that is representative of the formation is immersed in the drilling fluid of interest and a semipermeable membrane is interposed therebetween. When an oil-base or water-in-oil emulsion drilling fluid or the drilling fluid of this invention is used, the membrane will be inherently formed. In contrast with this, when a conventional water-base fluid is tested for use with the slug process of membrane application the samples must be dipped in the slug material so that a semipermeable membrane will be formed prior to immersion in the drilling fluid. After immersion, the direction of water migration is detected to ascertain which material has the higher vapor pressure. Although this could be determined by measuring the change in the water content of the drilling fluid, it is generally more convenient to measure the change in water content of the formation sample. A wide variety of physical characteristics reflect the water content of such a formation including its electrical resistivity, sonic velocity, weight, and many others. A preferred method is to measure deformation of the sample. Deformation can be logged optically, by micrometer, and by other mechanical methods, but the preferred method is to use a strain gauge transducer.

Figure 2:
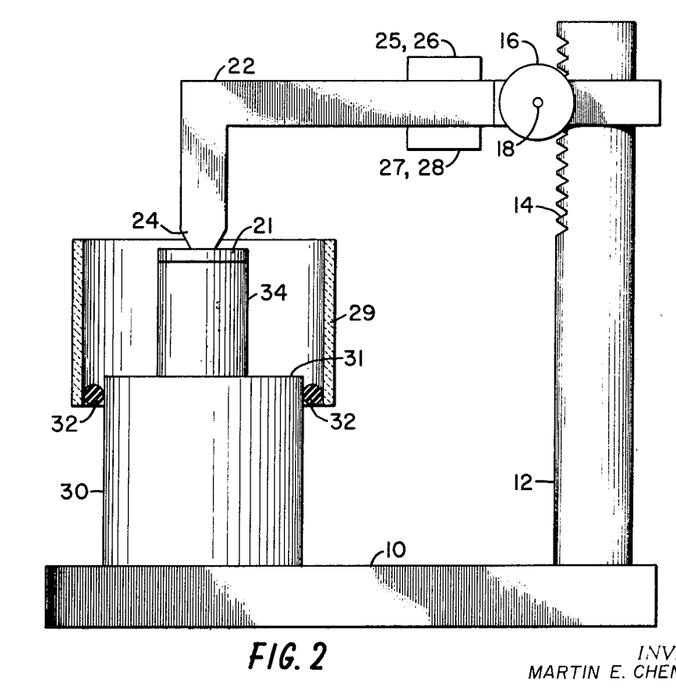
FIG. 2 schematically depicts an elevation view of a displacement transducer instrumented with strain gauges.
Figure 3:
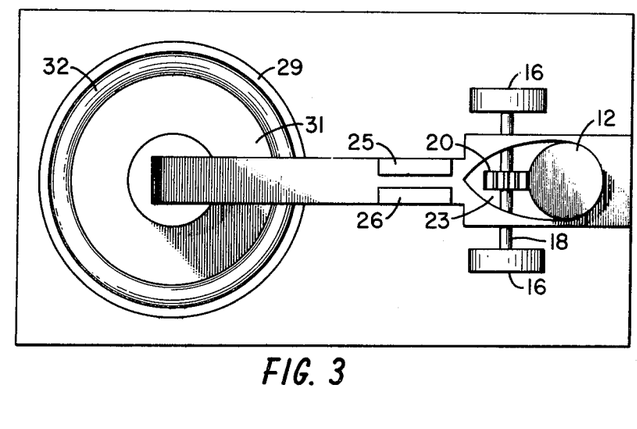
FIG. 3 is a schematic plan view of the apparatus of FIG. 2.

FIGS. 2 and 3 illustrate a resistance strain gauge displacement transducer suitable for measuring the change in dimensions of a sample of shale or similar material. This apparatus includes a rectangular base 10 from which a substantially cylindrical column 12 extends vertically. A series of beveled teeth on the upper portion of column 12 form rack 14.

Cantilever deflection beam 22 engages rack 14. The outermost end of the deflection beam extends downwardly in an L-shape terminating in a frustoconical end terminus 24. Contactor shoe 21 is mounted on end terminus 24. The innermost end of the deflection beam 22 contains a generally oval aperture 23, one end of which forms a yoke that fits over upright column 12 and forms a slidable support with the column. Shaft 18 passes through deflection beam 22 at the other end of aperture 23. Knobs 16 are mounted on the ends of shaft 18. Pinion 20 is supported on the shaft 18 in a position corresponding to the middle of the aperture to cooperate with rack 14. Upper strain gauges 25 and 26 are mounted on the upper side of deflection beam 22. Lower strain gauges 27 and 28 are positioned on the other side of the beam.

A cylindrical pedestal 30 extends from a rectangular base 10 underneath contactor shoe 21. The upper surface 31 of the cylindrical pedestal is smooth and forms a bearing surface underneath shale sample 34. Cylindrical cup 29 slides upon cylindrical pedestal 30. Sealing member 32 is mounted between the cup and the pedestal to prevent the leakage of fluid.

Figure 4:
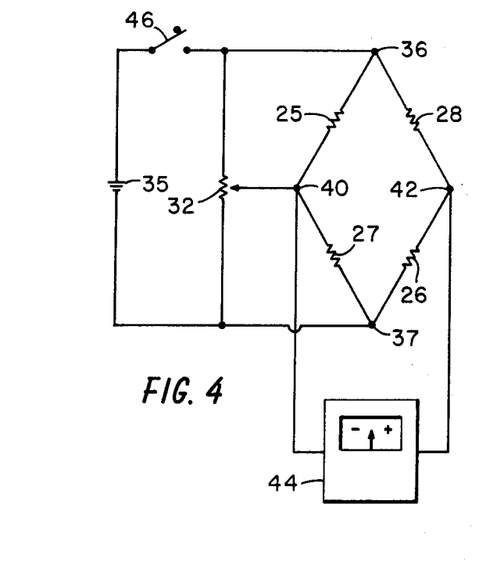
FIG. 4 is a schematic diagram of an electrical circuit that can be used with the apparatus of FIG. 2.

FIG. 4 illustrates an electrical circuit suitable for use with the strain gauge displacement transducer apparatus. A four-resistor electrical bridge in which strain gauges 25, 26, 27 and 28 form the resistors is shown. At least four resistors are generally used to obtain increased amplitude and inherent temperature compensation. Variable resistor 32 is placed in the circuit to balance the bridge prior to strain measurements. Voltage source 35 creates a difference in potential across resistor 32 and across the bridge between contacts 36 and 37, causing direct current to flow through resistor 32 and the legs of the bridge formed by resistors 25 and 27, and 26 and 28, respectively. Voltage is measured between terminals 40 and 42 by voltmeter 44. In lieu of this, a suitable strain indicator, such as Model P-350 sold by The Budd Company, Phoenixville, Pa., could be used. Switch 46 is used to turn the strain gauge transducer on and off. Although the relatively simple strains gauge circuit illustrated is suitable, other circuits such as those illustrated in M. Hetenyi's book *Handbook of Experimental Stress Analysis*, John Wiley & Sons, Inc., New York, N.Y. (1950) could readily be adopted.

Prior to using the strain gauge transducer, it should be calibrated to determine the relationship between observed voltages and displacements. This can be done by first zeroing the voltmeter, as is discussed below, and then placing successively larger or smaller articles of known length between contactor shoe 21 and cylindrical pedestal 30 and observing the voltages. From these data a constant that relates voltage and displacement can be obtained.

To use this equipment to analyze the relative vapor pressure of a drilling fluid and a particular shale, a sample of the shale which has been exposed to the membrane-forming material should be placed on surface 31 of cylindrical pedestal 30. Deflection beam 22 is then lowered by turning knob 16. This rotates shaft 18 on which pinion 20 is mounted. Pinion 20 cooperates with rack 14 to convert the rotational movement of the knob 16 into a downward translational movement of beam 22. The beam should be lowered until contactor shoe 21 engages the shale sample 34 and holds it firmly in place on surface 21 of the pedestal 30.

With the shale sample thus mounted, the strain gauge's electrical circuit should be balanced. Voltage source 35 is energized by closing switch 46, causing current to flow through variable resistor 32 and both sides of the resistance bridge. The bridge is balanced by adjusting variable resistor 32 until voltmeter 44 is zeroed. Once the bridge has been balanced, the voltage readings will indicate deformation. Cylindrical cup 29 is then raised to its uppermost position so that the upper edges of the cup are above the top of sample 34. Sufficient drilling fluid to cover the sample is then poured into the cup held between contactor shoe 21 and surface 31 of cylindrical pedestal 30.

Once the drilling fluid contacts the membrane-coated sample mounted within the strain gauge apparatus, the sample will begin to absorb water and expand if water is migrating from the fluid to the sample. Expansion of the sample will force contactor shoe 21 upward, deflecting beam 22. Deflection of the beam results in deformation of the strain gauges and produces an imbalance in voltage readings across the bridge. If, instead, water migrates from the sample to the fluid, the sample will generally exhibit shrinkage. Such shrinkage also normally produces an imbalance in voltage readings across the bridge. However, these voltages will have an opposite sign from those caused by swelling.

Several voltage readings should be taken at various times after the sample has been immersed in the drilling fluid. The voltage readings are proportional to the displacement of the sample between contactor shoe 21 and pedestal 30. The relationship between displacement and time can be determined from the calibration constant and used to determine the rate at which water will migrate between a formation sample and a particular drilling fluid. When comparing data, it is useful to normalize the displacement data by dividing each reading by the sample length. The normalized data is then referred to as "strain." It will be seen quite readily that the relative vapor pressure technique is not limited to applications such as the above. Instead, it will be applicable to any two materials which can have a semipermeable membrane interposed therebetween through which water may flow from one material to the other.

The displacement transducer apparatus is also useful for screening surfactants, oil, and other materials on the basis of their membrane-forming characteristics for use with the methods and fluid compositions of the invention. Typically, such tests first involve coating a sample of a water-sensitive shale formation with the material under consideration. As pointed out above, the procedure for applying a material to a sample varies slightly depending on whether the material is to be used with the slug process or in formulating one of the fluid compositions of the invention. In the former case the sample is immersed in the concentrated slug material; in the latter it is immersed in the drilling fluid in which the material to be tested is dispersed. The sample is then mounted in the displacement transducer apparatus and immersed in an aqueous solution having a known aqueous vapor pressure with respect to that of the sample. A 5-molar aqueous solution of $CaCl_2$ will frequently be found to have a vapor pressure substantially lower than that of the shale sample and may conveniently be used. Deformation, if any, if the sample with time is then observed and is compared with the performance of another sample of the same formation which has been exposed to fresh water but no membrane-forming material. Results of a series of such tests are tabulated below:

| | % Elongation of shale sample | | |
|---|---|---|---|
| No membrane-forming material | 0.1 hr. | 1.0 hr. | 10.0 hrs. |
| Fresh water | 0.53 | 0.86 | 0.98 |
| 5M $CaCl_2$ Solution | 0.08 | 0.23 | 0.66 |

| Membrane-forming Material Followed by 5M CaCl₂ Solution | | | |
|---|---|---|---|
| 50 vol % polyisobutylene acid 50 vol % N-hexane | 0 | −0.03 | −0.06 |
| 50 vol % polyisobutylene succinic acid 50 vol % N-hexane | −0.01 | −0.03 | −0.08 |
| 50 vol % dodecyl succinic acid 50 vol % N-hexane | 0 | −0.01 | −0.06 |

The positive values of elongation observed when the sample was immersed in either fresh water or 5 M CaCl₂ indicate that water and/or ions were being absorbed by the shale sample causing it to swell. The three samples treated with the test material and then immersed in a 5 M solution of CaCl₂ were each observed to shrink. This indicates that each of the three materials formed a semipermeable membrane and that water migrated from the shale sample to the CaCl₂ solution through the membrane in accordance with the aqueous vapor pressure gradient. To be sure that a material being evaluated forms a semipermeable membrane, it is preferred to lower the aqueous vapor pressure of the aqueous fluid or aqueous phase on the fluid side of the membrane to a value less than that of the argillaceous shale or other water-sensitive sample. If the test then shows (e.g., by shrinking of the sample) that water is moving from the sample, it is clear that no substantial movement of ions through the film is occurring.

The term "oil" has been used herein for simplicity. It is to be understood that the term "oil" is used to include mineral oils including virgin and refined hydrocarbon oils and fractions thereof, such hydrocarbon oils specifically including lube oils, diesel oils, asphalts and similar materials. Diesel oil, which is also commonly referred to as diesel fuel, is preferred because of its widespread availability and its low cost. It is also contemplated that vegetable oils and other similar materials will be suitable. Similarly, the terms surfactant and emulsifier as used herein contemplate the possibility of the use of mixtures of surfactants. It is well known, for instance, that commercial surfactants are prepared from stream which contain a series of different isomers, while commercial emulsifiers often are prepared from combinations of ionic and nonionic emulsifiers.

The utility of the water-base drilling fluid composition and the method of drilling a borehole through a water-sensitive formation is not limited to drilling operations. Rather, the fluid and method disclosed are useful in any well operation where the well fluid used comes in contact with a water-sensitive formation such as completion, stimulation, workover, secondary recovery, and many other well operations.

Figure 5:
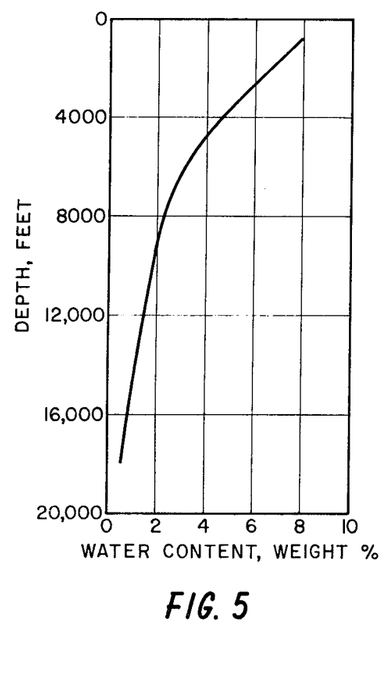
FIG. 5 is a correlation of water content versus depth for shales.

As pointed out above, in using the membrane test of the invention to determine the aqueous vapor pressure of a drilling fluid relative to the aqueous vapor pressure of a water-sensitive formation, it is important that the relative vapor pressure tests be run with a sample of the formation having substantially its in situ composition. Exposure to high temperatures and other treatment that may alter the composition should be avoided. It is preferred that the sample by in substantially its natural state of hydration so that its surface absorption behavior will approximate its in situ absorption behavior. Formation samples utilized may be preserved core samples from the subject well or from a nearby well that penetrates the same formation. Such preserved samples are particularly representative when the coring fluid used inhibits absorption of water by the water-sensitive formation. Fragments of the formation entrained by the drilling fluid and carried to the surface can also be used. Since a water-sensitive formation will normally begin hydration as soon as it is contacted with a water-containing drilling fluid, it is preferable that such fragments be recovered as early as possible after initial contact of the rock face by the fluid. Hence, the depth of the formation of interest should be estimated and samples from the earliest returns from drilling the formation should be secured for the test.

Where severe hydration of the formation has occurred, the samples obtained should be restored to their natural states of hydration. Restoration to a substantially natural state can be accomplished by baking the samples at a temperature slightly above 100° C. until sample density corresponds with the typical shale density for this formation and depth of burial. It is important that temperatures not greatly exceed 100° C., since excessive temperatures may result in substantial changes in characteristics of the sample. Sample density can be rapidly determined by means of a graduated-density liquid, the mercury pump pressure chamber method, or other suitable techniques. Correlations of shale density versus depth of burial are available in the literature for various formations and are typified by those of K. F. Dallmus in his article entitled, "Mechanics of Basin Evolution and Its Relation to the Habitat of Oil in the Basin," *Habitat of Oil, A Symposium*, Amer. Assoc. Petrol. Geol., p. 883–931, 1958. Such correlations may be used to estimate in situ density and thus water content of the water-sensitive formation. The formation water content may also be estimated from FIG. 5, which is a correlation showing how the water content of many shaley formations within the earth varies, on the average, with increasing depth of burial. A sample of a given formation can, accordingly, be restored or adjusted to approximate the in situ absorption characteristics of the formation by adjusting its water content, as necessary, to the in situ water content of the formation. The aqueous vapor pressure of the sample will then closely approximate the aqueous vapor pressure of the formation. The choice of a suitable aqueous drilling or other well fluid to be used with the formation can then be made in accordance with the invention through the use of a semipermeable membrane contacting both the fluid and the sample. Then, the aqueous vapor pressure of the fluid may be lowered by the addition of sodium chloride, calcium chloride or other aqueous vapor pressure depressants until the vapor pressure of the fluid bears the desired value relative to that of the sample. As stated previously, it will generally be preferred that these vapor pressures be equal so that no water flows through the membrane.

What is claimed is:

1. In a well operation a water-sensitive earth formation is contacted with a well fluid having water as the continuous phase, the improvement which comprises:
   a. interposing between said well fluid and said formation a semipermeable membrane; and
   b. maintaining the aqueous vapor pressure of said well fluid at a level approximately equal to or below the aqueous vapor pressure of said water-sensitive formation.

2. A method as defined by claim 1 wherein said semipermeable membrane is interposed by dispersing within said well fluid an oil containing a surfactant capable of causing said oil to coat said formation with a semipermeable membrane.

3. A method as defined by claim 2 wherein said surfactant is a water-in-oil emulsifier.

4. A method as defined by claim 3 wherein said water and said oil form a multiple emulsion comprised of bubbles of water surrounded by a film of oil dispersed in said water-continuous phase.

5. A method as defined by claim 1 wherein said semipermeable membrane is interposed by periodically contacting said water-sensitive formation with an oil capable of forming a semipermeable membrane on said formation.

6. A method as defined by claim 5 wherein said oil contains a surfactant capable of causing said oil to coat said water-sensitive formation with a semipermeable membrane.

7. A method as defined by claim 6 wherein said surfactant is a water-in-oil emulsifier.

8. A method as defined by claim 1 wherein said semipermeable membrane is interposed by periodically contacting said water-sensitive formation with a water-in-oil emulsion.

9. A method as defined by claim 1 wherein said semipermeable membrane is interposed by periodically contacting said water-sensitive formation with a surfactant capable of forming a semipermeable membrane on said formation.

10. A method as defined by claim 1 wherein said semipermeable membrane is interposed by periodically contacting said water-sensitive formation with a water-in-oil emulsion capable of forming a semipermeable membrane on said formation.

11. In a well operation wherein a water-sensitive argillaceous shale earth formation penetrated by the well is contacted with a well fluid having water as the continuous phase, the improvement which comprises:
   a. interposing between said well fluid and said formation a semipermeable membrane by periodically contacting the said water-sensitive formation with a surfactant which is water-in-oil emulsifier; and
   b. maintaining the aqueous vapor pressure of said well fluid at a level approximately equal to or below the aqueous vapor pressure of said water-sensitive formation.

12. In a well operation wherein a water-sensitive argillaceous shale earth formation penetrated by the well is contacted with a well fluid having water as the continuous phase, the improvement which comprises:
   a. interposing between said well fluid and said formation a semipermeable membrane; and
   b. maintaining the aqueous vapor pressure of said well fluid at a level approximately equal to the aqueous vapor pressure of said formation.

13. A method as defined by claim 12 wherein said semipermeable membrane is interposed by dispersing within said well fluid an oil treated with a surfactant capable of causing said oil to coat said formation with a semipermeable membrane.

14. A method as defined by claim 13 wherein said surfactant is a water-in-oil emulsifier.

15. A method as defined by claim 14 wherein said water and said oil form a multiple emulsion comprised of bubbles of water surrounded by a film of oil dispersed in said water-continuous phase.

16. A method as defined by claim 12 wherein said semipermeable membrane is interposed by periodically contacting said water-sensitive formation with an oil capable of forming a semipermeable membrane on said formation.

17. A method as defined by claim 16 wherein said oil contains a surfactant capable of causing said oil to coat said water-sensitive formation with a semipermeable membrane.

18. A method as defined by claim 17 wherein said surfactant is a water-in-oil emulsifier.

19. A method as defined by claim 12 wherein said semipermeable membrane is interposed by periodically contacting said water-sensitive formation with a surfactant capable of forming a semipermeable film on said formation.

20. In a well operation wherein a water-sensitive earth formation is contacted with a well fluid having water as the continuous phase, the improvement which comprises:
   a. interposing between said well fluid and said formation a semipermeable membrane by periodically contacting the said water-sensitive formation with a surfactant which is water-in-oil emulsifier capable of forming a semipermeable film of said formation; and
   b. maintaining the aqueous vapor pressure of said well fluid at a level approximately equal to or below the aqueous vapor pressure of said water-sensitive formation.

21. In a well operation wherein a water-sensitive earth formation is contacted with a well fluid having water as the continuous phase, the improvement which comprises:
   a. interposing between said well fluid and said formation a semipermeable membrane; and
   b. maintain the aqueous vapor pressure of said well fluid at a level to retard migration of water to said formation sufficiently to prevent any substantial degradation of said formation during the time said well fluid is in contact with said formation.

22. A method for determining the aqueous vapor pressure of one material relative to another wherein at least one of the materials contains water, which comprises interposing between said materials a semipermeable liquid membrane which contacts both of said materials, and detecting the direction of water migration between said materials through said membrane.

23. A method as defined by claim 22 wherein said membrane comprises a surfactant capable forming a semipermeable membrane.

24. A method as defined by claim 22 wherein said membrane comprises an oil capable of forming a semipermeable membrane.

25. A method as defined by claim 24 wherein said oil contains a surfactant capable of forming a semipermeable membrane.

26. A method as defined by claim 25 wherein said surfactant is a water-in-oil emulsifier.

27. A method for determining the aqueous vapor pressure of material relative to that of a sample of an earth formation which comprises interposing between said material and said sample a liquid semipermeable membrane which contacts both said material and said sample, and detecting the direction of water migration between said material and said sample through said membrane.

28. A method as defined by claim 27 wherein said membrane comprises a surfactant capable of forming a semipermeable on said sample.

29. A method as defined by claim 27 wherein said membrane comprises an oil capable of forming a semipermeable membrane on said sample.

30. A method as defined by claim 27 wherein said oil contains a surfactant capable of forming a semipermeable membrane on said sample.

31. A method as defined by claim 27 wherein said surfactant is a water-in-oil emulsifier.

32. A fluid for use in wells and similar boreholes comprising:
   a. a continuous aqueous phase;
   b. a dispersed phase comprising droplets of oil;
   c. a surfactant capable of causing said oil containing said surfactant to coat a water-sensitive earth formation with a semipermeable membrane; and
   d. an aqueous vapor pressure depressant in said continuous aqueous phase in a concentration sufficient to depress the aqueous vapor pressure of said fluid and retard invasion of said formation.

33. A fluid as defined by claim 32 wherein said surfactant is water-in-oil emulsifier.

34. A fluid as defined by claim 33 wherein the concentration of said vapor pressure depressant is sufficient to reduce the aqueous vapor pressure of said fluid below that of a saturated aqueous sodium chloride solution.

35. A fluid as defined by claim 33 wherein said aqueous phase is saturated with calcium chloride.

36. A fluid as defined by claim 33 wherein the concentration of said vapor pressure depressant is sufficient to reduce the aqueous vapor pressure of said fluid below that of a saturated aqueous calcium chloride solution.

37. A fluid for use in wells and similar boreholes comprising:
   a. a continuous aqueous phase;
   b. a dispersion of oil and water within said aqueous phase; said oil and water within said aqueous phase forming a multiple emulsion;
   c. a surfactant capable of causing said oil to coat a water-sensitive earth formation with a semipermeable membrane; and
   d. an aqueous vapor pressure depressant in said continuous aqueous phase in a concentration sufficient to depress the aqueous vapor pressure of said fluid and retard invasion of said formation.

38. A fluid as defined by claim 37 wherein said surfactant is a water-in-oil emulsifier.

39. A fluid as defined by claim 38 wherein the concentration of said vapor pressure is sufficient to reduce the aqueous vapor pressure of said fluid below that of a saturated aqueous sodium chloride solution.

40. A fluid as defined by claim 38 wherein said aqueous phase is saturated with calcium chloride.

41. A fluid as defined by claim 38 wherein the concentration of said vapor pressure depressant is sufficient to reduce the aqueous vapor pressure of said fluid below that of a saturated calcium chloride solution.

* * * * *

UNITED STATES PATENT OFFICE
CERTIFICATE OF CORRECTION

Patent No. 3,628,615          Dated December 21, 1971

Inventor(s)  Martin E. Chenevert

It is certified that error appears in the above-identified patent and that said Letters Patent are hereby corrected as shown below:

At column 4, line 10, between "sample" and "sub-" insert - and -.
At column 4, line 73, between "with" and "method" insert - the -.
At column 5, line 62, between "at" and "level" insert - a -.
At column 6, line 62, delete "ONe" and insert - One -.
At column 7, line 57, delete "strains" and insert - strain -.
At column 9, line 41, delete "stream" and insert - streams -.
At column 9, line 60, delete "by" and insert - be -.
At column 11, line 13, before "water-in-oil" insert - a -.
At column 11, line 58, before "water-in-oil" insert - a -.
At column 11, line 59, delete "of" and insert - on -.
At column 11, line 68, delete "maintain" and insert - maintaining -.
At column 12, line 18, between "of" and "material" insert - a -.

Signed and sealed this 20th day of June 1972.

(SEAL)
Attest:

EDWARD M. FLETCHER, JR.　　　　　　　　　ROBERT GOTTSCHALK
Attesting Officer　　　　　　　　　　　　Commissioner of Patents